(12) United States Patent
Kasperchik et al.

(10) Patent No.: US 7,575,848 B2
(45) Date of Patent: Aug. 18, 2009

(54) IMAGE RECORDING MEDIA AND IMAGE LAYERS

(75) Inventors: Vladek Kasperchik, Corvallis, OR (US); Mark Sanders Taylor, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 180 days.

(21) Appl. No.: 11/786,164

(22) Filed: Apr. 11, 2007

(65) Prior Publication Data

US 2008/0254395 A1 Oct. 16, 2008

(51) Int. Cl.
*G03F 7/00* (2006.01)
*G03F 7/004* (2006.01)

(52) U.S. Cl. .......... 430/270.1; 430/19; 430/270.15; 430/311; 430/330; 430/913

(58) Field of Classification Search .......... 430/19, 430/270.1, 270.15, 311, 330, 913
See application file for complete search history.

(56) References Cited

U.S. PATENT DOCUMENTS

| | | | |
|---|---|---|---|
| 7,270,865 B2 * | 9/2007 | Gore | 428/64.4 |
| 2005/0053748 A1 * | 3/2005 | Gore et al. | 428/64.4 |
| 2005/0089782 A1 | 4/2005 | Kasperchik et al. | |
| 2006/0009356 A1 | 1/2006 | Muryama et al. | |
| 2006/0063672 A1 | 3/2006 | Chang et al. | |
| 2007/0212639 A1 * | 9/2007 | Kasperchik et al. | 430/270.1 |
| 2007/0238045 A1 * | 10/2007 | Brocklin et al. | 430/270.1 |
| 2007/0238613 A1 * | 10/2007 | Brocklin et al. | 503/226 |
| 2007/0281244 A9 * | 12/2007 | Kasperchik et al. | 430/270.1 |

OTHER PUBLICATIONS

International Search Report; PCT Patent Application No. PCT/US2008/059659, filed Apr. 8, 2008; search issued by Korean Patent Office (ISA) Oct. 7, 2008.

* cited by examiner

*Primary Examiner*—Amanda C. Walke

(57) ABSTRACT

Imaging layers, image recording media, and methods of preparation of each, are disclosed.

18 Claims, 1 Drawing Sheet

IMAGE RECORDING MEDIA AND IMAGE LAYERS

BACKGROUND

Compositions that produce a color change upon exposure to energy in the form of light are of great interest in producing images on a variety of substrates. For example, labeling of optical storage media such as Compact Discs, Digital Video Discs or Blue Laser Discs (CD, DVD, or Blue Laser Disc) can be routinely accomplished through screen-printing methods. While this method can provide a wide variety of label content, it tends to be cost ineffective for run lengths less than 300-400 discs because the fixed cost of unique materials and set-up are shared by all the discs in each run. In screen-printing, a stencil of the image is prepared, placed in contact with the disc and then ink is spread by squeegee across the stencil surface. Where there are openings in the stencil the ink passes through to the surface of the disc, thus producing the image. Preparation of the stencil can be an elaborate, time-consuming and expensive process.

In recent years, significant increases in use of CD/DVD discs as a data distribution vehicle have increased the need to provide customized label content to reflect the data content of the disc. For these applications, the screen-label printing presents a dilemma as discs are designed to permit customized user information to be recorded in standardized CD, DVD, or Blue Laser Disc formats. Today, for labeling small quantities of discs, popular methods include hand labeling with a permanent marker pen, using an inkjet printer to print an adhesive paper label, and printing directly with a pen on the disc media which has a coating that has the ability to absorb inks. The hand printing methods do not provide high quality and aligning a separately printed label by hand is inexact and difficult.

It may therefore be desirable to design an optical data recording medium (e.g., CD, DVD, or Blue Laser Disc) which can be individually labeled by the user easily and inexpensively relative to screen-printing while giving a high quality label solution. It may also be desirable to design an optical data recording medium that accepts labeling via multiple methods, thus reducing the amount of inventory necessarily carried by optical data recording merchants and end users.

A variety of leuco dye-containing compositions have been investigated for use on optical disks and other substrates. Leuco dye compositions include a leuco dye along with an optional activator and an infrared absorber. However, many of these compositions are insufficiently stable when exposed to visible light. Many commonly used NIR radiation absorbers are cyanine dyes that have very good extinction in NIR range combined with very poor stability when exposed to visible light (especially blue part of the spectrum). Thus Leuco-dye compositions with cyanine radiation absorbers tend to have very good marking sensitivity in the beginning that decays at a fast rate when the coating composition is exposed to the visible light.

SUMMARY

Briefly described, embodiments of this disclosure include image recording coating, methods of making image recording coatings, and substrates having a layer disposed thereon. One exemplary embodiment of the image recording coating, among others, includes a substrate having a layer disposed thereon, wherein the layer includes: a matrix; a first radiation-absorbing compound that absorbs radiation energy at a first wavelength and a second wavelength, wherein the first radiation-absorbing compound has an extinction coefficient greater than about $0.5 \times 10^5$ ml*$g^{-1}$*$cm^{-1}$ at the first wavelength, wherein the first wavelength is about 700 to 1000 nm and the second wavelength is about 350 to 500 nm; a shielding radiation-absorbing compound that absorbs radiation energy a the second wavelength, wherein the shielding radiation-absorbing compound has an extinction coefficient greater than or equal to about $0.1 \times 10^5$ ml*$g^{-1}$*$cm^{-1}$ at the second wavelength, wherein the shielding radiation-absorbing compound is stable when exposed to radiation energy at the second wavelength, wherein the shielding radiation-absorbing compound absorbs the radiation energy at the second wavelength preferentially over the first radiation-absorbing compound; an activator; and a color former, wherein the activator and the color former react to form a mark upon absorption of radiation energy by the first radiation-absorbing compound at the first wavelength.

Another exemplary embodiment of the method for preparing a recording medium, among others, includes: providing a matrix; a first radiation-absorbing compound that absorbs radiation energy at a first wavelength and a second wavelength, wherein the first radiation-absorbing compound has an extinction coefficient greater than about $0.5 \times 10^5$ ml*$g^{-1}$*$cm^{-1}$ at the first wavelength, wherein the first wavelength is about 700 to 1000 nm and the second wavelength is about 350 to 500 nm; a shielding radiation-absorbing compound that absorbs radiation energy a the second wavelength, wherein the shielding radiation-absorbing compound has an extinction coefficient greater than or equal to about $0.1 \times 10^5$ ml*$g^{-1}$*$cm^{-1}$ at the second wavelength, wherein the shielding radiation-absorbing compound is stable when exposed to radiation energy at the second wavelength, wherein the shielding radiation-absorbing compound absorbs the radiation energy at the second wavelength preferentially over the first radiation-absorbing compound; an activator; and a color former; mixing the first radiation-absorbing compound, the shielding radiation-absorbing compound, the activator, and the color former, in the matrix to form a matrix mixture; and disposing the matrix mixture onto a substrate, wherein the activator and the color former react to form a mark upon absorption of radiation energy by the first radiation-absorbing compound at the first wavelength.

Another exemplary embodiment of substrate having a layer disposed thereon, among others, includes: a matrix; a first radiation-absorbing compound that absorbs radiation energy at a first wavelength and a second wavelength, wherein the first radiation-absorbing compound has an extinction coefficient greater than about $0.5 \times 10^5$ ml*$g^{-1}$*$cm^{-1}$ at the first wavelength, wherein the first wavelength is about 700 to 1000 nm and the second wavelength is about 350 to 500 nm; a shielding radiation-absorbing compound that absorbs radiation energy a the second wavelength, wherein the shielding radiation-absorbing compound has an extinction coefficient greater than or equal to about $0.1 \times 10^5$ ml*$g^{-1}$*$cm^{-1}$ at the second wavelength, wherein the shielding radiation-absorbing compound is stable when exposed to radiation energy at the second wavelength, wherein the shielding radiation-absorbing compound absorbs the radiation energy at the second wavelength preferentially over the first radiation-absorbing compound; an activator; and a color former, wherein the activator and the color former react to form a mark upon absorption of radiation energy by the first radiation-absorbing compound at the first wavelength.

BRIEF DESCRIPTION OF THE DRAWINGS

Many aspects of this disclosure can be better understood with reference to the following drawings. The components in the drawings are not necessarily to scale. Moreover, in the drawings, like reference numerals designate corresponding parts throughout the several views.

DETAILED DESCRIPTION

Figure 1:
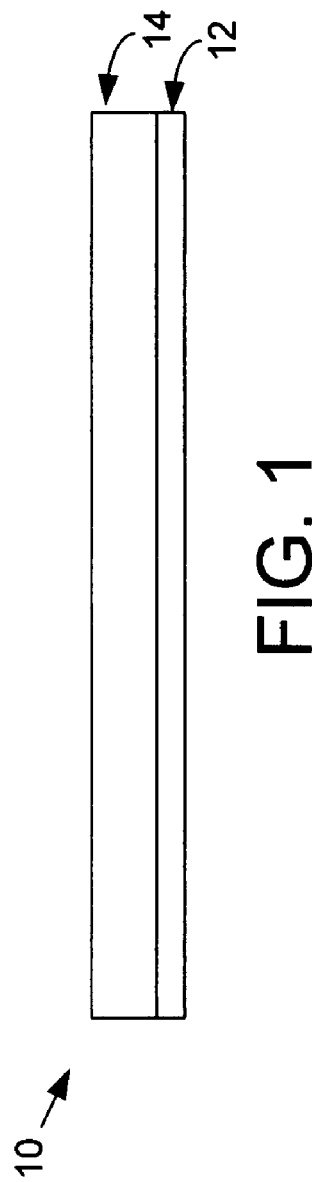
FIG. 1 illustrates an illustrative embodiment of the imaging medium.

Embodiments of the present disclosure will employ, unless otherwise indicated, techniques of synthetic organic chemistry, ink chemistry, media chemistry, and the like, that are within the skill of the art. Such techniques are explained fully in the literature.

The following examples are put forth so as to provide those of ordinary skill in the art with a complete disclosure and description of how to perform the methods and use the compositions disclosed and claimed herein. Efforts have been made to ensure accuracy with respect to numbers (e.g., amounts, temperature, etc.) but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an" and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

As used herein, the term "leuco-dye" means a color-forming substance that is colorless or of a first color in a non-activated state, and subsequently exhibits color or changes from the first color to a second color in an activated state.

As used herein, the term "activator" is a substance that reacts with a color former such as a leuco-dye, causing the leuco-dye to alter its chemical structure and change or acquire color.

As used herein, the term "radiation-absorbing compound" is an "antenna". The antenna readily absorbs a desired specific wavelength range.

Discussion

Embodiments of the disclosure include image recording coatings, image recording media, and methods of making each. The image-recording medium includes an image layer or coating including, but not limited to, a matrix, a color former, an activator, and at least two radiation-absorbing compounds. Typical imaging layers include cyanine dye radiation-absorbing compounds because they have a high extinction (e.g., greater than about $0.5 \times 10^5$ ml*$g^{-1}$*$cm^{-1}$) for radiation in the near infrared region of the spectrum and visible (red) regions (about 700 to 1000 nm). However, cyanine dye radiation-absorbing compounds are problematic because they have rather poor lightfastresistance (e.g., becomes unstable). The rapid lightfade of the cyanine dye radiation-absorbing compounds when exposed to ambient daylight or office lighting conditions is related to their capability to absorb radiation in the blue and near UV region of the spectrum (about 350 to 500 nm). In this regard, imaging layers can lose sensitivity to imaging laser radiation upon relatively short ambient daylight exposure because the cyanine dye radiation-absorbing compounds absorb radiation in the blue and near UV of the spectrum and fade. Fading of the radiation-absorbing compound in the imaging layer leads to marking sensitivity loses in the image layer.

In contrast, the image recording layers of the present disclosure reduces marking sensitivity degradation related to the fading of the radiation-absorbing compound. In particular, a first radiation-absorbing compound (e.g., a cyanine dye radiation-absorbing compound) has a high extinction (e.g., greater than about $0.5 \times 10^5$ ml*$g^{-1}$*$cm^{-1}$) in the imaging wavelength range, while a second radiation-absorbing compound (e.g., a shielding radiation-absorbing compound) has an extinction (greater than or equal to $0.1 \times 10^5$ ml*$g^{-1}$*$cm^{-1}$) in the blue/near UV radiation range (about 350 to 500 nm). In an embodiment, the second radiation-absorbing compound may have a lower extinction (less than about $0.5 \times 10^5$ ml*$g^{-1}$*$cm^{-1}$) in the imaging wavelength range (about 700 to 1000 nm).

A feature of the shielding radiation-absorbing compound is its very good lightfade resistance. In short, the shielding radiation-absorbing compound intercepts and absorbs a significant portion of the radiation in the blue/near UV radiation range (remaining stable (intact) in the process) that would otherwise degrade the cyanine dye radiation-absorbing compound. In other words, the shielding radiation-absorbing compound competes with and preferentially (compared to the first radiation-absorbing compound) absorbs the radiation in the blue/near UV radiation range so that the first radiation-absorbing compound is impacted/degraded significantly less by the blue/near UV radiation range. Thus, embodiments of the present disclosure extend the lifetime of the image layer from a few days or weeks to a few months or years of ambient light exposure.

The image layer can be a coating disposed onto a substrate and used in structures such as, but not limited to, paper, digital recording material, cardboard (e.g., packaging box surface), plastic (e.g., food packaging surface), and the like.

A clear mark and excellent image quality can be obtained by directing radiation energy (e.g., a 780 nm laser operating at 35 mW) at areas of the image layer on which a mark is desired. As mentioned above, the components in the image layer used to produce the mark via a color change upon stimulation by energy can include, but is not limited to, the matrix, the color former (e.g., a leuco dye), the activator, and at least two radiation-absorbing compounds (a first radiation absorbing compound and a shielding radiation absorbing compound). In an embodiment, the components can be dissolved into a matrix material. In another embodiment, one or more components can be insoluble or substantially insoluble in the matrix material at ambient temperatures, where the components are uniformly dispersed throughout the matrix material.

In an embodiment, when the first radiation-absorbing compound absorbs particular radiation energy, the heat generated from the radiation-absorbing compound allows a reaction between the color former and the activator to occur and to produce a color change (e.g., a mark).

The first radiation-absorbing compound functions to absorb a significant portion of the radiation energy, convert the energy into heat, and deliver the heat to the components of the matrix. The radiation energy may then be applied by way of an infrared laser. Upon application of the radiation energy, both the color former and the activator may become heated and mix, which causes the color former to become activated and cause a mark (color) to be produced.

FIG. 1 illustrates an embodiment of an imaging medium 10. The imaging medium 10 can include, but is not limited to, a substrate 12 and a layer 14. The substrate 12 can be a substrate upon which it is desirable to make a mark, such as, but not limited to, paper (e.g., labels, tickets, receipts, or stationery), overhead transparencies, a metal/metal composite, glass, a ceramic, a polymer, and a labeling medium (e.g., a compact disk (CD) (e.g., CD-R/RW/ROM) and a digital video disk (DVD) (e.g., DVD-R/RW/ROM)). In particular, the substrate 12 includes an "optical disk" which is meant to encompass audio, video, multi-media, and/or software disks that are machine readable in a CD and/or DVD drive, or the like. Examples of optical disk formats include writeable, recordable, and rewriteable disks such as DVD-HD, Blu-ray, DVD, DVD-R, DVD-RW, DVD+R, DVD+RW, DVD-RAM, CD, CD-ROM, CD-R, CD-RW, and the like. Other like formats can also be included, such as similar formats and formats to be developed in the future.

The layer 14 can include, but is not limited to, the matrix, the color former (e.g., a leuco dye), the activator, and at least two radiation-absorbing compounds (a first radiation-absorbing compound and a shielding radiation-absorbing compound), as well as other components typically found in the particular media to be produced.

The layer 14 may be applied to the substrate 12 via any acceptable method, such as, but not limited to, rolling, spraying, and screen-printing. In addition, one or more layers can be formed between the layer 14 and the substrate 12 and/or one or more layer can be formed on top of the layer 14. In one embodiment, the layer 14 is part of a CD or a DVD.

To form a mark, radiation energy is directed imagewise at one or more discrete areas of the layer 14 of the imaging medium 10. The form of radiation energy may vary depending upon the equipment available, ambient conditions, the desired result, and the like. The radiation energy can include, but is not limited to, infrared (IR) radiation, ultraviolet (UV) radiation, x-rays, and visible light. In an embodiment, the radiation-absorbing compound absorbs the radiation energy and heats the area of the layer 14 to which the radiation energy impacts. The first radiation-absorbing compound absorbs the radiation and produces heat that may cause the color former and the activator to mix. The color former and the activator may then react to form a mark (color) on certain areas of the layer 14.

Figure 2:
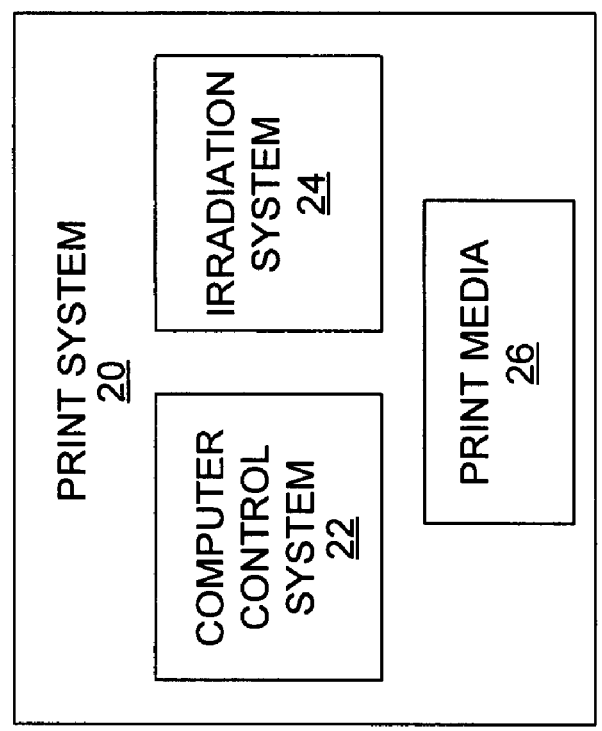
FIG. 2 illustrates a representative embodiment of a printer system.

FIG. 2 illustrates a representative embodiment of a print system 20. The print system 20 can include, but is not limited to, a computer control system 22, an irradiation system 24, and print media 26 (e.g., imaging medium). The computer control system 22 is operative to control the irradiation system 24 to cause marks (e.g., printing of characters, symbols, photos, and the like) to be formed on the print media 26. The irradiation system 24 can include, but is not limited to, a laser system, UV energy system, IR energy system, visible energy system, x-ray system, and other systems that can produce radiation energy to cause a mark to be formed on the layer 14. The print system 20 can include, but is not limited to, a laser printer system and an ink-jet printer system. In addition, the print system 20 can be incorporated into a digital media system. For example, the print system 20 can be operated in a digital media system to print labels (e.g., the layer is incorporated into a label) onto digital media such as CDs and DVDs. Furthermore, the print system 20 can be operated in a digital media system to directly print onto the digital media (e.g., the layer is incorporated the structure of the digital media).

As mentioned above, the image layer can include, but is not limited to, the matrix, the color former (e.g., a leuco dye), the activator, and at least two radiation-absorbing compounds (a first radiation-absorbing compound and a shielding radiation-absorbing compound).

The matrix 16 (also referred to as "matrix material" and "matrix compound") can include compounds capable of and suitable for dissolving and/or dispersing the radiation-absorbing compound, the activator, and/or the color former. The matrix 16 can include, but is not limited to, water or solvent soluble/dispersable polymers or radiation (UV)-curable monomers, oligomers, and pre-polymers (e.g., acrylate derivatives). Illustrative examples of water or solvent soluble/dispersable polymers (that may be mixed to form a suitable matrix) can include but are not limited to, polyvinyl alcohol, polyvinyl chloride, polyvinyl butyral, cellulose esters and blends such as cellulose acetate butyrate, polymers of styrene, butadiene, ethylene, poly carbonates, polymers of vinyl carbonates (e.g., CR39 (available from PPG industries, Pittsburgh), co-polymers of acrylic and allyl carbonate monomers (e.g., BX-946 (available form Hampford Research, Stratford, Conn.),). Illustrative examples of UV-curable monomers, oligomers and pre-polymers include, but are not limited to: hexamethylene diacrylate, tripropylene glycol diacrylate, lauryl acrylate, isodecyl acrylate, neopentyl glycol diacrylate, isobornyl acrylate, 2-phenoxyethyl acrylate, 2(2-ethoxy)ethylacrylate, polyethylene glycol diacrylate and other acrylated polyols, trimethylolpropane triacrylate, pentaerythritol tetraacrylate, ethoxylated bisphenol A diacrylate, acrylic oligomers with epoxy functionality, and the like.

In addition, the matrix can include, but is not limited to, UV curable matrices such as acrylate derivatives, oligomers and monomers, with a photopackage. A photopackage may include a light absorbing species which initiate reactions for curing of a lacquer, such as, by way of example, benzophenone derivatives. Other examples of photoinitiators for free radical polymerization monomers and pre-polymers include but are not limited to thioxanethone derivatives, anthraquinone derivatives, acetophenones and benzoine ethers.

In an embodiment, it may be desirable to choose a matrix that is cured by a form of radiation that does not cause a color change either by itself or through interaction with color-forming components. An example of a matrix is a mixture of UV curable acrylate monomers and oligomers that contains a photoinitiator (hydroxy ketone) and a mixture of difunctional and monofunctional acrylates and methacrylates such as, but not limited to, hexanediol diacrylate, isobornyl acrylate, tripropyleneglycol diacrylate, bis-A epoxydiacrylate. Other matrix materials may include, but are not limited to, acrylated polyester oligomers, such as CN293 and CN294 as well as CN-292 (low viscosity polyester acrylate oligomer), SR-351 (trimethylolpropane triacrylate), SR-395 (isodecyl acrylate) and SR-256 (2(2-ethoxyethoxy)ethyl acrylate) (all of which are available from Sartomer Co.).

The matrix compound 16 is about 2 wt % to 98 wt % of the layer and about 20 wt % to 90 wt % of the layer.

The term "color former" is a color forming substance, which is colorless or one color in a non-activated state and produces or changes color in an activated state. The color former can include, but is not limited to, leuco dyes and phthalide color formers (e.g., fluoran leuco dyes and phthalide color formers as described in "The Chemistry and Applications of Leuco Dyes", Muthyala, Ramiah, ed., Plenum Press (1997) (ISBN 0-306-45459-9), incorporated herein by reference).

The color former can include a wide variety of leuco dyes. Suitable leuco dyes include, but are not limited to, fluorans, phthalides, amino-triarylmethanes, aminoxanthenes, aminothioxanthenes, amino-9,10-dihydro-acridines, aminophenoxazines, aminophenothiazines, aminodihydro-phenazines, aminodiphenylmethanes, aminohydrocinnamic acids (cyanoethanes, leuco methines) and corresponding esters, 2(p-hydroxyphenyl)-4,5-diphenylimidazoles, indanones, leuco indamines, hydrozines, leuco indigoid dyes, amino-2,3-dihydroanthraquinon-es, tetrahalo-p,p'-biphenols, 2(p-hydroxyphenyl)-4,5-diphenylimidazoles, phenethylanilines, phthalocyanine precursors (such as those available from Sitaram Chemicals, India), and other known leuco dye compositions. Experimental testing has shown that fluoran based dyes are one class of leuco dyes which exhibit particularly desirable properties.

In one aspect of the present disclosure, the leuco dye can be a fluoran, phthalide, aminotriarylmethane, or mixture thereof. Several non-limiting examples of suitable fluoran based leuco dyes include 3-diethylamino-6-methyl-7-anilinofluorane, 3-(N-ethyl-p-toluidino)-6-meth-yl-7-anilinofluorane, 3-(N-ethyl-N-isoamylamino)-6-methyl-7-anilinofluoran-e, 3-diethylamino-6-methyl-7-(o,p-dimethylanilino)fluorane, 3-pyrrolidino-6-methyl-7-anilinofluorane, 3-piperidino-6-methyl-7-anilino-fluorane, 3-(N-cyclohexyl-N-methylamino)-6-methyl-7-anilinofluorane, 3-diethylamino-7-(m-trifluoromethylanilino)fluorane, 3-dibutylamino-6-methyl-7-anilinofluorane, 3-diethylamino-6-chloro-7-anilinofluorane, 3-dibutylamino-7-(o-chloroanilino) fluorane, 3-diethylamino-7-(o-chloroanilino)fluorane, 3-di-n-pentylamino-6-methyl-7-anilinofluoran, 3-di-n-butylamino-6-methyl-7-anilinofluoran, 3-(n-ethyl-n-isopentylamino)-6-methyl-7-anilinofluoran, 3-pyrrolidino-6-methyl-7-anilinofluoran, 1(3H)-isobenzofuranone,4,5,6,7-t-etrachloro-3,3-bis[2-[4-(dimethylamino)phenyl]-2-(4-methoxyphenyl)ethenyl]-, 2-anilino-3-methyl-6-(N-ethyl-N-isoamylamino)fluorane (S-205 available from Nagase Co., Ltd), and mixtures thereof. Suitable aminotriarylmethane leuco dyes can also be used in the present invention such as tris(N,N-dimethylaminophenyl)methane (LCV); tris(N,N-diethylaminophenyl)methane (LECV); tris(N,N-di-n-propylaminophenyl)methane (LPCV); tris(N,N-di-n-butylaminophenyl)methane (LBCV); bis(4-diethylaminophenyl)-(4-diethylamino-2-methyl-phenyl)methane (LV-1); bis(4-diethylamino-2-methylphenyl)-(4-diethylamino-phenyl) methane (LV-2); tris(4-diethylamino-2-methylphenyl) methane (LV-3); bis(4-diethylamino-2-methylphenyl)(3,4-dimethoxyphenyl)methane (LB-8); aminotriarylmethane leuco dyes having different alkyl substituents bonded to the amino moieties wherein each alkyl group is independently selected from C1-C4 alkyl; and aminotriaryl methane leuco dyes with any of the preceding named structures that are further substituted with one or more alkyl groups on the aryl rings wherein the latter alkyl groups are independently selected from C1-C3 alkyl. Other leuco dyes can also be used in connection with the present disclosure and are known to those skilled in the art. A more detailed discussion of some of these types of leuco dyes may be found in U.S. Pat. Nos. 3,658,543 and 6,251,571, each of which are hereby incorporated by reference in their entireties. Additional examples and methods of forming such compounds can be found in Chemistry and Applications of Leuco Dyes, Muthyala, Ramaiha, ed., Plenum Press, New York, London; ISBN: 0-306-45459-9, which is hereby incorporated by reference.

The color former may exist in the image layer as either: a) as a separate phase finely dispersed in the matrix phase (e.g., Leuco-dye particle size <5 µm, preferably <2 µm, most preferably <1 µm), or b) or being completely dissolved in the matrix phase at the stage of coating preparation. In a) many fluoran Leuco-dyes are poorly soluble in UV-curable matrices. In a) the heating of the coating by radiation results of Leuco-dye dissolution in the matrix. For example, some of the commercial Leuco-dyes such as 3,3'-Bis(1-n-octyl-2-methylindol-3-yl)phthalide commercially known as Pergascript Red 16B or Specialty Red 16 have relatively high solubility (up to ~20 wt. %) in many commercially available acrylate and methacrylate monomers.

The color former is from about 3 wt % to 50 wt % of the layer and from about 20 wt % to 40 wt % of the layer.

As used herein, the term "activator" is a substance that reacts with a color former and causes the color former to alter its chemical structure and change or acquire color. The activators may include, but are not limited to, proton donors and acidic phenolic compounds (e.g., benzyl hydroxybenzoate, bisphenol-A and bisphenol-S) as well as derivatives thereof (e.g., D8™ (4-hydroxyphenyl-4'-isopropoxyphenyl sulfone), TG-SA™ (bis(4-hydroxy-3-allylphenyl)sulfone), polyphenols, and sulfonylurea and derivatives thereof. The activator is from about 2 wt % to 50 wt % of the layer and, preferably, from about 5 wt % to 35 wt % of the layer.

The term "radiation-absorbing compound" (e.g., an antenna) includes a radiation-absorbing compound (first radiation-absorbing compound) in which the antenna readily absorbs a desired specific wavelength of the marking radiation. The first radiation-absorbing compound can be a material that effectively absorbs the type of energy to be applied to the imaging medium 10 to effect a mark or color change.

The first radiation-absorbing compound can act as an energy antenna, providing energy to surrounding areas upon interaction with an energy source. As a predetermined amount of energy can be provided by the first radiation-absorbing compound, matching of the radiation wavelength and intensity to the particular first radiation-absorbing compound used can be carried out to optimize the system within a desired optimal range. In an embodiment, the first radiation-absorbing compound is a cyanine dye.

The first radiation-absorbing compound can be selected from a number of radiation absorbers such as, but not limited to:

a) IR-780 iodide, (Aldrich 42,531-1) (1) (3H-Indolium, 2-[2-[2-chloro-3-[(1,3-dihydro-3,3-dimethyl-1-propyl-2H-indol-2-ylidene)ethylidene]-1-cyclohexen-1-yl]ethenyl]-3,3-dimethyl-1-propyl-, iodide (9CI)), b) IR783 (Aldrich 54,329-2) (2) (2-[2-[2-Chloro-3-[1,3-dihydro-3,3-dimethyl-1-(4-sulfobutyl)-2H-indol-2-ylidene]-ethylidene]-1-cyclohexen-1-yl]-ethenyl]-3,3-dimethyl-1-(4-sulfobutyl)-3H-indoliumhydroxide, inner salt sodium salt).

c) 3H-Indolium, 2-[2-[2-chloro-3-[(1,3-dihydro-1,3,3-trimethyl-2H-indol-2-ylidene)ethylidene]-1-cyclopenten-1-yl] ethenyl]-1,3,3-trimethyl-, salt with 4-methylbenzenesulfonic acid (1:1) (9CI)-(Lambda max —797 nm). CAS No. 193687-61-5. Available from "Few Chemicals GMBH" asS0337.

d) 3H-Indolium, 2-[2-[3-[(1,3-dihydro-1,3,3-trimethyl-2H-indol-2-ylidene)ethylidene]-2-[(1-phenyl-1H-tetrazol-5-yl)thio]-1-cyclohexen-1-yl]ethenyl]-1,3,3-trimethyl-, chloride (9Cl). (Lambda max —798 nm). CAS No. 440102-72-7. Available from "Few Chemicals GMBH" as S0507.

e) 1H-Benz[e]indolium, 2-[2-[2-chloro-3-[(1,3-dihydro-1,1,3-trimethyl-2H-benz[e]indol-2-ylidene)ethylidene]-1-cyclohexen-1-yl]ethenyl]-1,1,3-trimethyl-, chloride (9Cl) (Lambda max —813 nm). CAS No. 297173-98-9. Available from "Few Chemicals GMBH" as S0391.

f) 1H-Benz[e]indolium, 2-[2-[2-chloro-3-[(1,3-dihydro-1,1,3-trimethyl-2H-benz[e]indol-2-ylidene) ethylidene]-1-cyclohexen-1-yl]ethenyl]-1,1,3-trimethyl-, salt with 4-methylbenzenesulfonic acid (1:1) (9Cl) (Lambda max —813 nm). CAS No. 13412748-3. Available from "Few Chemicals GMBH" as S0094. Also known as Trump Dye or Trump IR.

g) 1H-Benz[e]indolium, 2-[2-[2-chloro-3-[(3-ethyl-1,3-dihydro-1,1-dimethyl-2H-benz[e]indol-2-ylidene)ethylidene]-1-cyclohexen-1-yl]ethenyl]-3-ethyl-1,1-dimethyl-, salt with 4-methylbenzenesulfonic acid (1:1) (9Cl) (Lambda max —816 nm). CAS No. 460337-33-1. Available from "Few Chemicals GMBH" as S0809.

The first radiation-absorbing compound is from about 0.01 wt % to 10 wt % of the layer and from about 0.1 wt % to 3.0 wt % of the layer.

The shielding radiation-absorbing compound can act as an energy antenna for radiation in the blue/near UV radiation range (e.g., about 350-450 nm). In particular, the shielding radiation-absorbing compound has a significant extinction (greater than or equal to $0.1 \times 10^5$ ml*$g^{-1}$*$cm^{-1}$) in the blue/near UV radiation range (so it can compete in near UV/Blue absorption with the first radiation-absorbing compound). In short, the shielding radiation-absorbing compound intercepts and absorbs a significant portion of the radiation in the blue/near UV radiation range that would otherwise degrade the first radiation-absorbing compound. Thus, embodiments of the present disclosure extend the lifetime of the image layer from a few days or weeks to a few. In an embodiment, the shielding radiation-absorbing compound can absorb radiation energy at the imaging wavelength range (about 700 to 1000 nm), while in another embodiment, the shielding radiation-absorbing compound does not absorb radiation energy at the imaging wavelength range.

The shielding radiation-absorbing compound can be selected from a number of photo stable (i.e., lightfade resistant) radiation absorbers such as, but not limited to, phthalocyanine and naphthalocyanine dyes and pigments that are known for the robust photostability. In particular, the shielding radiation-absorbing compound can include compounds such as, but not limited to: a) phthalocyanine derivative NIR dye (Projet NP 800 (U.S. Pat. No. 6,015,896 A1 and U.S. Pat. No. 6,025,486A1) available from Avecia/Fuji); and b) naphthalocyanine NIR pigment YKR-5010 available from Yamamoto Chemical.

The shielding radiation-absorbing compound is from about 0.05 wt % to 10 wt % of the layer and from about 0.3 wt % to 5.0 wt % of the layer.

Having summarized embodiments, reference will now be made in detail to the illustrative Examples. While the disclosure is described in connection with the Examples, there is no intent to limit the embodiments of the disclosure to the following example. On the contrary, the intent is to cover all alternatives, modifications, and equivalents included within the spirit and scope of the disclosure.

EXAMPLE 1

The following is an illustrative example of an embodiment of the present disclosure. The image recording coating can be prepared by dissolving the Bisphenol S in the UV-curable monomer mix to form a first solution. Then, the other soluble components (e.g., IR780, D8, SDP, Pergafast-201, and Irgacure-1300) are dissolved in the mixture. Subsequently, Foamblast-20F is added to the mixture. Finely-milled BK400 leuco-dye and YKR-5010 are dispersed in the mixture (using 3-roll milling).

| Coating with improved photostability/marking sensitivity | wt % |
| --- | --- |
| UV-curable monomer mix | 50% |
| BK400 Leuco-dye (milled down to 0.3-0.4 um) | 25% |
| IR780 cyanine Antenna dye | 1% |
| 4-Hydroxy-4'-isopropoxydiphenyl sulfone (D8) (phenolic developer) | 6% |
| Bisphenol S (phenolic developer) | 4% |
| Irgacure-1300 (photoinitiator) | 6.5% |
| Pergafast-201 (sulfonylurea developer) | 4% |
| Foamblast-20F | 2% |
| YKR-5010 stable NIR pigment | 1.5% |
| Total | 100% |

| UV-curable monomer mix | wt. % |
| --- | --- |
| SR238 | 25% |
| SR506 | 35% |
| Ebecryl-605 | 26% |
| SR306HP | 14% |
| Total | 100% |

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include ±1%, ±2%, ±3%, ±4%, ±5%, ±6%, ±7%, ±8%, ±9%, or ±10%, or more of the numerical value(s) being modified. In addition, the phrase "about 'x' to 'y'" includes "about 'x' to about 'y'".

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. An image recording coating comprising:
a substrate having a layer disposed thereon, wherein the layer includes:
a matrix;
a first radiation-absorbing compound that absorbs radiation energy at a first wavelength and a second wavelength, wherein the first radiation-absorbing compound has an extinction coefficient greater than about $0.5 \times 10^5$ ml*$g^{-1}$*$cm^{-1}$ at the first wavelength, wherein the first wavelength is about 700 to 1000 nm and the second wavelength is about 350 to 500 nm;
a shielding radiation-absorbing compound that absorbs radiation energy a the second wavelength, wherein the shielding radiation-absorbing compound has an extinction coefficient greater than or equal to about $0.1 \times 10^5$ ml*$g^{-1}$*$cm^{-1}$ at the second wavelength, wherein the shielding radiation-absorbing compound is stable when exposed to radiation energy at the second wavelength, wherein the shielding radiation-absorbing compound absorbs the radiation energy at the second wavelength preferentially over the first radiation-absorbing compound;
an activator; and
a color former, wherein the activator and the color former react to form a mark upon absorption of radiation energy by the first radiation-absorbing compound at the first wavelength,
wherein the layer includes: matrix in an amount of about 2 to 98 weight percent of the layer, the first radiation-absorbing compound in an amount of about 0.01 to 10 weight percent of the layer, the second radiation-absorbing compound in an amount of about 0.05 to 10 weight percent of the layer, the activator in an amount of about 20 to 50 weight percent of the layer, and the color former in an amount of about 3 to 50 weight percent of the layer.

2. The image recording coating of claim 1, wherein the first radiation-absorbing compound is selected from: (3H-Indolium, 2-[2-[2-chloro-3-[(1,3-dihydro-3,3-dimethyl-1-propyl-2H-indol-2-ylidene)ethylidene]-1-cyclohexen-1-yl]ethenyl]-3,3-dimethyl-1-propyl-, iodide (9CI)); (2-[2-[2-Chloro-3-[1,3-dihydro-3,3-dimethyl-1-(4-sulfobutyl)-2H-indol-2-ylidene]-ethylidene]-1-cyclohexen-1-yl]-ethenyl]-3,3-dimethyl-1-(4-sulfobutyl)-3H-indoliumhydroxide, inner salt sodium salt; 2-[2-[2-chloro-3-[(1,3-dihydro-1,3,3-trimethyl-2H-indol-2-ylidene)ethylidene]-1-cyclopenten-1-yl]ethenyl]-1,3,3-trimethyl-, salt with 4-methylbenzenesulfonic acid (1:1) (9CI); 2-[2-[3-[(1,3-dihydro-1,3,3-trimethyl-2H-indol-2-ylidene)ethylidene]-2-[(1-phenyl-1H-tetrazol-5-yl)thio]-1-cyclohexen-1-yl]ethenyl]-1,3,3-trimethyl-, chloride (9CI); 2-[2-[2-chloro-3-[(1,3-dihydro-1,1,3-trimethyl-2H-benz[e]indol-2-ylidene)ethylidene]-1-cyclohexen-1-yl]ethenyl]-1,1,3-trimethyl-, chloride; 2-[2-[2-chloro-3-[(1,3-dihydro-1,1,3-trimethyl-2H-benz[e]indol-2-ylidene) ethylidene]-1-cyclohexen-1-yl]ethenyl]-1,1,3-trimethyl-, salt with 4-methylbenzenesulfonic acid (1:1); 2-[2-[2-chloro-3-[(3-ethyl-1,3-dihydro-1,1-dimethyl-2H-benz[e]indol-2-ylidene)ethylidene]-1-cyclohexen-1-yl]ethenyl]-3-ethyl-1,1-dimethyl-, salt with 4-methylbenzenesulfonic acid (1:1); and combinations thereof.

3. The image recording coating of claim 1, wherein the second radiation-absorbing compound and is selected from: phthalocyanine dyes, phthalocyanine pigments, naphthalocyanine dyes, naphthalocyanine pigments, and combinations thereof.

4. The image recording coating of claim 1, wherein the substrate is selected from a paper medium, a transparency and an optical disk.

5. The image recording coating of claim 1, wherein the substrate is an optical disk format selected from one the following: DVD-HD, Blu-ray, DVD, DVD-R, DVD-RW, DVD+R, DVD+RW, DVD-RAM, CD, CD-ROM, CD-R, and CD-RW.

6. The image recording coating of claim 1, wherein the substrate is selected from cardboard and plastic.

7. A method for preparing a recording medium, the method comprising:
providing a matrix; a first radiation-absorbing compound that absorbs radiation energy at a first wavelength and a second wavelength, wherein the first radiation-absorbing compound has an extinction coefficient greater than about $0.5 \times 10^5$ ml*$g^{-1}$*$cm^{-1}$ at the first wavelength, wherein the first wavelength is about 700 to 1000 nm and the second wavelength is about 350 to 500 nm; a shielding radiation-absorbing compound that absorbs radiation energy a the second wavelength, wherein the shielding radiation-absorbing compound has an extinction coefficient greater than or equal to about $0.1 \times 10^5$ ml*$g^{-1}$*$cm^{-1}$ at the second wavelength, wherein the shielding radiation-absorbing compound is stable when exposed to radiation energy at the second wavelength, wherein the shielding radiation-absorbing compound absorbs the radiation energy at the second wavelength preferentially over the first radiation-absorbing compound; an activator; and a color former;
mixing the first radiation-absorbing compound, the shielding radiation-absorbing compound, the activator, and the color former, in the matrix to form a matrix mixture; and
disposing the matrix mixture onto a substrate, wherein the activator and the color former react to form a mark upon absorption of radiation energy by the first radiation-absorbing compound at the first wavelength,
wherein the layer includes: matrix in an amount of about 2 to 98 weight percent of the layer, the first radiation-absorbing compound in an amount of about 0.01 to 10 weight percent of the layer, the second radiation-absorbing compound in an amount of about 0.05 to 10 weight percent of the layer, the activator in an amount of about 20 to 50 weight percent of the layer, and the color former in an amount of about 3 to 50 weight percent of the layer.

8. The method of claim 7, wherein the substrate is selected from a paper medium, a transparency, an optical media, wherein the optical media is selected from a compact disk (CD), and a digital video disk (DVD).

9. The method of claim 7, wherein the substrate is an optical disk format selected from one the following: DVD-HD, Blu-ray, DVD, DVD-R, DVD-RW, DVD+R, DVD+RW, DVD-RAM, CD, CD-ROM, CD-R, and CD-RW.

10. The method of claim 7, wherein the first radiation-absorbing compound is selected from: (3H-Indolium, 2-[2-[2-chloro-3-[(1,3-dihydro-3,3-dimethyl-1-propyl-2H-indol-2-ylidene)ethylidene]-1-cyclohexen-1-yl]ethenyl]-3,3-dimethyl-1-propyl-, iodide (9CI)); (2-[2-[2-Chloro-3-[1,3-dihydro-3,3-dimethyl-1-(4-sulfobutyl)-2H-indol-2-ylidene]-ethylidene]-1-cyclohexen-1-yl]-ethenyl]-3,3-dimethyl-1-(4-sulfobutyl)-3H-indoliumhydroxide, inner salt sodium salt; 2-[2-[2-chloro-3-[(1,3-dihydro-1,3,3-trimethyl-2H-indol-2-ylidene)ethylidene]-1-cyclopenten-1-yl]ethenyl]-1,3,3-trimethyl-, salt with 4-methylbenzenesulfonic acid (1:1) (9CI); 2-[2-[3-[(1,3-dihydro-1,3,3-trimethyl-2H-indol-2-ylidene)ethylidene]-2-[(1-phenyl-1H-tetrazol-5-yl)

thio]-1-cyclohexen-1-yl]ethenyl]-1,3,3-trimethyl-, chloride (9Cl); 2-[2-[2-chloro-3-[(1,3-dihydro-1,1,3-trimethyl-2H-benz[e]indol-2-ylidene)ethylidene]-1cyclohexen-1-yl]ethenyl]-1,1,3-trimethyl-, chloride; 2-[2-[2-chloro-3-[(1,3-dihydro-1,1,3-trimethyl-2H-benz[e]indol-2-ylidene) ethylidene]-1-cyclohexen-1-yl]ethenyl]-1,1,3-trimethyl-, salt with 4-methylbenzenesulfonic acid (1:1); 2-[2-[2-chloro-3-[(3-ethyl-1,3-dihydro-1,1-dimethyl-2H-benz[e]indol-2-ylidene)ethylidene]-1-cyclohexen-1-yl]ethenyl]-3-ethyl-1,1-dimethyl-, salt with 4-methylbenzenesulfonic acid (1:1); and combinations thereof.

11. The method of claim 7, wherein the second radiation-absorbing compound is selected from: phthalocyanine dyes, phthalocyanine pigments, naphthalocyanine dyes, naphthalocyanine pigments, and combinations thereof.

12. A substrate having a layer disposed thereon, wherein the layer includes:
a matrix;
a first radiation-absorbing compound that absorbs radiation energy at a first wavelength and a second wavelength, wherein the first radiation-absorbing compound has an extinction coefficient greater than about $0.5 \times 10^5$ ml*g$^{-1}$*cm$^{-1}$ at the first wavelength, wherein the first wavelength is about 700 to 1000 nm and the second wavelength is about 350 to 500 nm;
a shielding radiation-absorbing compound that absorbs radiation energy a the second wavelength, wherein the shielding radiation-absorbing compound has an extinction coefficient greater than or equal to about $0.1 \times 10^5$ ml*g$^{-1}$*cm$^{-1}$ at the second wavelength, wherein the shielding radiation-absorbing compound is stable when exposed to radiation energy at the second wavelength, wherein the shielding radiation-absorbing compound absorbs the radiation energy at the second wavelength preferentially over the first radiation-absorbing compound;
an activator; and
a color former, wherein the activator and the color former react to form a mark upon absorption of radiation energy by the first radiation-absorbing compound at the first wavelength.
wherein the layer includes: matrix in an amount of about 2 to 98 weight percent of the layer, the first radiation-absorbing compound in an amount of about 0.01 to 10 weight percent of the layer, the second radiation-absorbing compound in an amount of about 0.05 to 10 weight percent of the layer, the activator in an amount of about 2 to 50 weight percent of the layer, and the color former in an amount of about 3 to 50 weight percent of the layer.

13. The substrate of claim 12, wherein the first radiation-absorbing compound is selected from: (3H-Indolium, 2-[2-[2-chloro-3-[(1,3dihydro-3,3-dimethyl-1-propyl-2H-indol-2-ylidene)ethylidene]-1-cyclohexen-1-yl]ethenyl]-3,3-dimethyl-1-propyl-, iodide (9Cl)); (2-[2-[2-Chloro-3-[2-[1,3-dihydro-3,3-dimethyl-1-(4-sulfobutyl)-2H-indol-2-ylidene]-ethylidene]-1-cyclohexen-1-yl]-ethenyl]-3,3-dimethyl-1-(4-sulfobutyl)-3H-indoliumhydroxide, inner salt sodium salt; 2-[2-[2-chloro-3-[(1,3-dihydro-1,3,3-trimethyl-2H-indol-2-ylidene)ethylidene]-1-cyclopenten-1-yl]ethenyl]-1,3,3-trimethyl-, salt with 4-methylbenzenesulfonic acid (1:1) (9Cl); 2-[2-[3-[(1,3-dihydro-1,3,3-trimethyl-2H-indol-2-ylidene)ethylidene]-2-[(1-phenyl-1H-tetrazol-5-yl)thio]-1-cyclohexen-1-yl]ethenyl]-1,3,3-trimethyl-, chloride (9Cl); 2-[2-[2-chloro-3-[(1,3-dihydro-1,1,3-trimethyl-2H-benz[e]indol-2-ylidene)ethylidene]-1-cyclohexen-1-yl]ethenyl]-1,1,3-trimethyl-, chloride; 2-[2-[2-chloro-3-[(1,3-dihydro-1,1,3-trimethyl-2H-benz[e]indol-2-ylidene) ethylidene]-1-cyclohexen-1-yl]ethenyl]-1,1,3-trimethyl-, salt with 4methylbenzenesulfonic acid (1:1); 2-[2-[2-chloro-3-[(3-ethyl-1,3-dihydro-1,1-dimethyl-2H-benz[e]indol-2-ylidene)ethylidene]-1-cyclohexen-1-yl]ethenyl]-3-ethyl-1,1-dimethyl-, salt with 4-methylbenzenesulfonic acid (1:1); and combinations thereof.

14. The substrate of claim 12, wherein the second radiation-absorbing compound and is selected from: phthalocyanine dyes, phthalocyanine pigments, naphthalocyanine dyes, naphthalocyanine pigments, and combinations thereof.

15. The substrate of claim 12, wherein the substrate is selected from a paper medium and a transparency.

16. The substrate of claim 12, wherein the substrate is an optical disk.

17. The substrate of claim 12, wherein the substrate is an optical disk format selected from one the following: DVD-HD, Blu-ray, DVD, DVD-R, DVD-RW, DVD+R, DVD+RW, DVD-RAM, CD, CD-ROM, CD-R, and CD-RW.

18. The substrate of claim 12, wherein the substrate is selected from cardboard and plastic.

* * * * *

UNITED STATES PATENT AND TRADEMARK OFFICE
CERTIFICATE OF CORRECTION

PATENT NO. : 7,575,848 B2  
APPLICATION NO. : 11/786164  
DATED : August 18, 2009  
INVENTOR(S) : Vladek Kasperchik et al.

It is certified that error appears in the above-identified patent and that said Letters Patent is hereby corrected as shown below:

IN THE CLAIMS:

In column 11, line 14, in Claim 1, delete "a the" and insert -- at the --, therefor.

In column 11, line 29, in Claim 1, delete "matrix" and insert -- the matrix --, therefor.

In column 11, line 35, in Claim 1, delete "20" and insert -- 2 --, therefor.

In column 11, line 56, in Claim 2, delete "ylidene) ethylidene]" and insert -- ylidene)ethylidene] --, therefor.

In column 12, line 5, in Claim 5, delete "the" and insert -- of the --, therefor.

In column 12, line 21, in Claim 7, delete "a the" and insert -- at the --, therefor.

In column 12, line 39, in Claim 7, delete "matrix" and insert -- the matrix --, therefor.

In column 12, line 45, in Claim 7, delete "20" and insert -- 2 --, therefor.

In column 12, line 52, in Claim 9, delete "the" and insert -- of the --, therefor.

In column 13, line 3, in Claim 10, delete "1cyclohexen-1" and insert -- 1-cyclohexen-1 --, therefor.

In column 13, lines 5-6, in Claim 10, delete "ylidene) ethylidene]" and insert -- ylidene)ethylidene] --, therefor.

In column 13, line 27, in Claim 12, delete "a the" and insert -- at the --, therefor.

In column 13, line 41, in Claim 12, delete "wavelength." and insert -- wavelength, --, therefor.

Signed and Sealed this

Seventh Day of September, 2010

David J. Kappos  
*Director of the United States Patent and Trademark Office*

CERTIFICATE OF CORRECTION (continued)
U.S. Pat. No. 7,575,848 B2

In column 13, line 42, in Claim 12, delete "matrix" and insert -- the matrix --, therefor.

In column 14, line 8, in Claim 13, delete "3dihydro-3," and insert -- 3-dihydro-3, --, therefor.

In column 14, lines 23-24, in Claim 13, delete "ylidene) ethylidene]" and insert -- ylidene)ethylidene --, therefor.

In column 14, line 25, in Claim 13, delete "4methylbenzenesulfonic" and insert -- 4-methylbenzenesulfonic --, therefor.

In column 14, line 39, in Claim 17, delete "the" and insert -- of the --, therefor.